United States Patent [19]
Bernet et al.

[11] Patent Number: 5,764,645
[45] Date of Patent: Jun. 9, 1998

[54] IP/ATM NETWORK ADAPTATION

[75] Inventors: Yoram Bernet, Seattle; James C. Stewart, Woodinville; John R. Douceur, Bellevue, all of Wash.

[73] Assignee: Microsoft Corporation, Redmond, Wash.

[21] Appl. No.: 662,825

[22] Filed: Jun. 12, 1996

[51] Int. Cl.⁶ ..................................................... H04L 12/56
[52] U.S. Cl. .......................... 370/466; 370/395; 370/468; 370/469; 370/471; 370/478
[58] Field of Search .................... 370/229, 230, 370/252, 389, 395, 397, 412, 431, 437, 465, 466, 468, 469, 470, 471, 474, 478; 395/200.62, 200.65, 200.66, 200.8

[56] References Cited

U.S. PATENT DOCUMENTS

| | | | |
|---|---|---|---|
| 5,414,650 | 5/1995 | Hekhuis | 364/715.02 |
| 5,623,605 | 4/1997 | Keshav et al. | 395/200.66 |
| 5,633,866 | 5/1997 | Callon | 370/397 |
| 5,673,263 | 9/1997 | Basso et al. | 370/396 |

Primary Examiner—Hassan Kizou
Attorney, Agent, or Firm—Lee & Hayes, PLLC

[57] ABSTRACT

A digital communications network comprises a plurality of network hosts connected to communicate using an ATM network. Each network host uses policies (configured by the network administrator) to control an IP/ATM protocol layer. Based on these policies, the IP/ATM protocol layer classifies submitted IP packets and establishes and manages ATM connections having parameters appropriate for each class of traffic. By configuring the policies, the network administrator can tune the hosts to optimally use network resources. The resources of primary concern are available bandwidth and connection setup capacity. In the simplest case, the IP/ATM protocol layer classifies packets submitted from the IP network protocol as data traffic or control traffic based on packet size. Generally, large IP packets are classified as data traffic, while smaller IP packets are classified as control traffic. Data traffic is sent over the ATM network using ATM connections having relatively high bandwidths and relatively short time-outs. Control traffic is sent over the ATM network using ATM connections having relatively low bandwidths and relatively long time-outs.

53 Claims, 5 Drawing Sheets

IP/ATM NETWORK ADAPTATION

TECHNICAL FIELD

This invention relates to equipment and software used in conjunction with digital communication networks and particularly to such equipment and software used in conjunction with ATM (asynchronous transfer mode) communication networks.

BACKGROUND OF THE INVENTION

Asynchronous Transfer Mode (ATM) is the name given to a high-speed, connection-oriented networking technology that has been used in both local-area and wide-area data communications networks. An ATM network consists of a high-speed communications medium and one or more high-speed switches that each connect to host computers and to other ATM switches. At the lowest level, data is transported using fixed-size frames called cells. Because each cell is exactly the same size (53 bytes), ATM switch hardware can process cells quickly.

Before a network host connected to an ATM network can send cells, the originating network host must first interact with the ATM switching equipment to specify a destination. The interaction is analogous to placing a telephone call. The host specifies the remote computer's address, and waits for the ATM switch to contact the remote system and establish a path. If the remote computer rejects the request, does not respond, or the ATM switch cannot currently reach the remote computer, the request to establish communication fails.

When a connection succeeds, the local ATM switch chooses an identifier for the connection, and passes the connection identifier to the host along with a message that informs the host of success. The host uses the connection identifier when sending or receiving cells.

When it finishes using a connection, the host again communicates with the ATM switch to request that the connection be broken or "torn down." This is equivalent to hanging up a telephone at the end of a telephone call. After disconnection, the switch can reuse the connection identifier.

The ATM protocol theoretically supports connections at several different quality of service (QoS) levels. The first of these is referred to as constant bit rate or CBR. A CBR connection guarantees a specific requested bandwidth from the underlying communications medium. This bandwidth is reserved and unavailable for other connections until the connection is torn down or terminated, even if the bandwidth is not fully utilized. Switches use a trivial algorithm to decide whether to grant a CBR connection—the connection is allowed if the requested bandwidth is available.

Variable bit rate or VBR connections are intended to be used for connections bearing traffic at a non-constant or variable bit rate. A VBR connection is specified in terms of peak cell rate (PCR), sustained cell rate (SCR) and burst length. Presumably, this allows an ATM switch to use some means of statistical multiplexing when determining whether to allow a requested connection. Most VBR implementations are not practical for bursty traffic. Either they allocate bandwidth conservatively (in which case large traffic bursts are dropped, making the connection unreliable), or they allocate bandwidth liberally (in which case they may be almost as wasteful of bandwidth as CBR connections).

Unspecified bit rate or UBR connections can be set up at any time, regardless of available bandwidth. All traffic submitted to a UBR connection is directed to a low priority queue in the switch and transmitted by the switch only if there is available bandwidth. While traffic may be submitted in arbitrary bursts, it will be discarded if there is insufficient available bandwidth. This assures that UBR traffic will interfere only with other UBR traffic, and will not compromise CBR traffic. Because traffic may be discarded without transmission, however, this type of connection is inherently unreliable.

Available bit rate or ABR is similar to UBR in that it provides available bandwidth. However, unlike UBR, ABR uses flow control to assure that data is delivered reliably. It requires sophisticated flow control mechanisms to be implemented in switches and end stations. ABR is unavailable in most current ATM implementations.

In the CBR mode of operation, an ATM network suffers from the following disadvantage. Bandwidth is wasted if the connection is allowed to remain open between traffic bursts. While VBR, UBR and ABR modes of operation may circumvent this problem, these are not always practical (for reasons seen above).

This invention allows efficient use of ATM networks in conjunction with the CBR mode of operation. References to the "connection-oriented" nature of ATM presume, primarily, the CBR mode of operation.

The Internet Protocol (IP) is a widely used connectionless network protocol. IP defines the nature of packets used for network transfers, and also specifies various details relating to addressing and routing.

It is possible for different network layers, including IP and ATM, to work together as different layers of a network protocol stack. A network protocol stack is a set of protocols that progresses from a low-level protocol (such as one that defines physical and electrical characteristics of a network communications medium) to a high-level protocol (such as one that defines interactions with application programs). Each protocol in the stack is said to comprise a network protocol layer. Each layer provides a service to the layer above and enhances the service provided by the layer below. By making the functions in each layer independent of those in other layers, new functions or enhancements of existing functions can be implemented with little or no disruption to other layers. This approach helps reduce design complexity and offers the advantages of ease of modification and flexibility.

Figure 1:
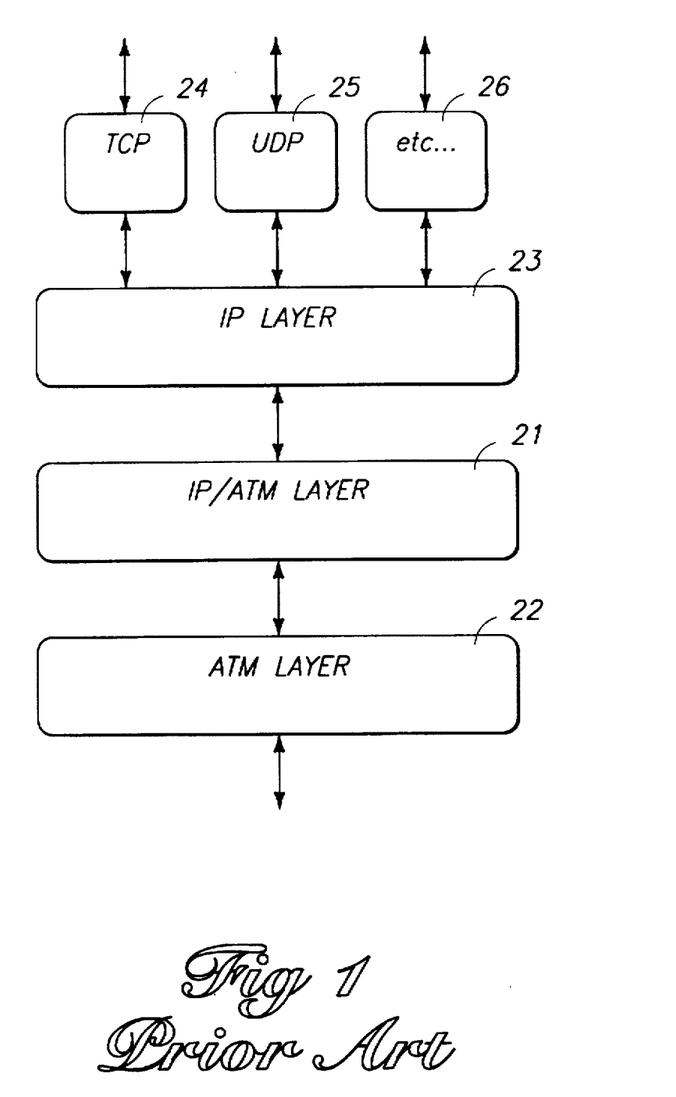
FIG. 1 illustrates a network protocol stack in accordance with the prior art that uses both IP and ATM.

FIG. 1 shows pertinent parts of a protocol stack using both IP and ATM. An ATM layer 22 is shown at the bottom of the stack, and can be considered to include link and physical layers of the protocol stack.

An IP protocol layer 23 resides in the protocol stack above ATM layer 22. Higher, transport layer protocols, such as a TCP protocol 24, a UDP protocol 25, and other protocols 27, are included in the protocol stack above IP protocol layer 23.

An IP/ATM protocol layer 21 is positioned in the protocol stack between IP layer 23 and ATM layer 22. The IP/ATM protocol layer is responsible for setting up connections through the ATM network to carry IP packets. Such packets are passed to the an appropriate connection in the ATM layer 22. The ATM layer is responsible for encapsulating the packets into ATM layer specific packets, such as ATM Adaptation Layer 5 (AAL5) packets, segmenting them into ATM cells, and transmitting them into the network.

A system that uses IP in conjunction with ATM is sometimes referred to as an IP/ATM (IP over ATM) system. Popular application programs written for IP can theoretically be used in an IP/ATM system without any modifications.

Existing IP/ATM protocol layer implementations do not adequately address how to efficiently use ATM network resources in conjunction with IP traffic. At present, ATM connections are most often specified as CBR connections. CBR commits constant bandwidth and is therefore well suited for constant bandwidth traffic such as audio and video. However, it is not well suited for bursty traffic (such as traditional IP data). For example, if a CBR connection is opened at a low bandwidth, it will take a long time to transmit large bursts of data over it. If the CBR connection is opened at a high bandwidth, large data bursts can be transmitted quickly; however, either the connection must be closed between bursts or large amounts of potentially available bandwidth are wasted during the interburst time periods.

To conserve network bandwidth, it is desirable to close CBR connections between data bursts. However, this has two negative effects. First, it requires reopening it for the next burst, which causes a delay and compromises the responsiveness of the network. Second, it increases the connection management load on the network. Network switches have limited capacity to setup and tear down connections. Too many connection setups/tear downs, in too short a time period, wreak havoc with the network.

SUMMARY OF THE INVENTION

The invention described below provides efficient use of ATM network resources (bandwidth and call setup/tear down capacity), in conjunction with a higher-level IP network protocol. Submitted IP packets are classified in the preferred embodiment as either data traffic (characterized by large, sporadic bursts) or control traffic (characterized by smaller, more frequent bursts). ATM connection types are specified for each submitted traffic classification.

IP packets classified as data traffic are transmitted using ATM connections having relatively high bandwidths. However, connections of this type are torn down after a relatively short period of inactivity to improve network efficiency.

IP packets classified as control traffic are transmitted using ATM connections having relatively low bandwidths. Connections of this type, however, are allowed to exist for a relatively long period of inactivity. This improves responsiveness for control traffic without unduly compromising bandwidth efficiency (since the low bandwidth of control connections has a relatively minor impact on the aggregate network bandwidth resources).

Using the embodiment described herein, a system administrator can tune the network by way of configuration parameters. These parameters can be set separately for every network host. They specify how packet classifications are made and also specify the characteristics of different types of ATM connections established to transmit different classifications of IP traffic.

DETAILED DESCRIPTION OF THE PREFERRED EMBODIMENT

The following discussion assumes a general familiarity with network technology, and specifically with IP and ATM network technology and protocols. The following references, incorporated herein by reference, provide useful introductions to these areas of technology: Comer, Douglas E.: *Internetworking with TCP/IP Volume* 1: *Principles, Protocols, and Architecture*, 3rd ed., Prentice Hall, New Jersey, 1995; *Asynchronous Transfer Mode: Bandwidth for the Future*, Telco Systems, Norwood, Mass., 1992; and De Prycker, Martin: *Asynchronous Transfer Mode: Solution for Broadband ISDN*, 2nd ed., Ellis Horwood, New York, 1993.

Figure 2:
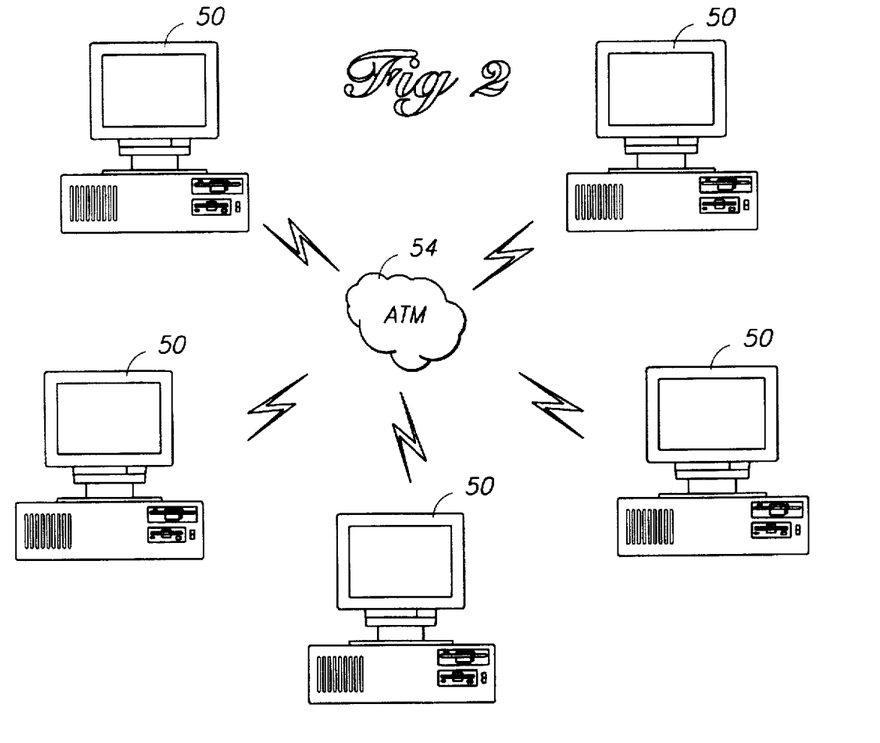
FIG. 2 is a block diagram of a network system in accordance with a preferred embodiment of the invention.
Figure 3:
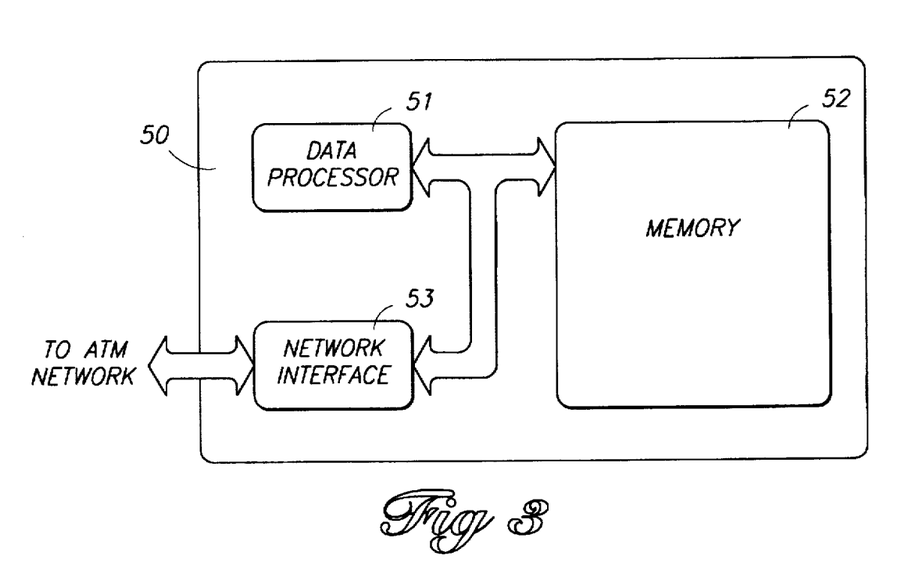
FIG. 3 is a simplified block diagram of network host in accordance with the preferred embodiment of the invention.

The preferred embodiment of the invention includes a system as illustrated in FIG. 2, including a plurality of network hosts 50 and an ATM communications medium 54 connecting the hosts. FIG. 3 shows general components of network host 50. Network host 50 might be a conventional computer such as a personal desktop or laptop computer. It might alternatively comprise a television set-top box or other user interface device for use in conjunction with a video display device or television. It includes a data processor 51, a computer-readable storage medium 52, and an ATM network interface 53. The ATM network interface is connected to the ATM communications network.

Storage medium 52 preferably includes both volatile and non-volatile memory, such as electronic DRAM and EEPROM. Memory 52 might also comprise magnetic or optical-based memory in removable or non-removable format.

Figure 4:
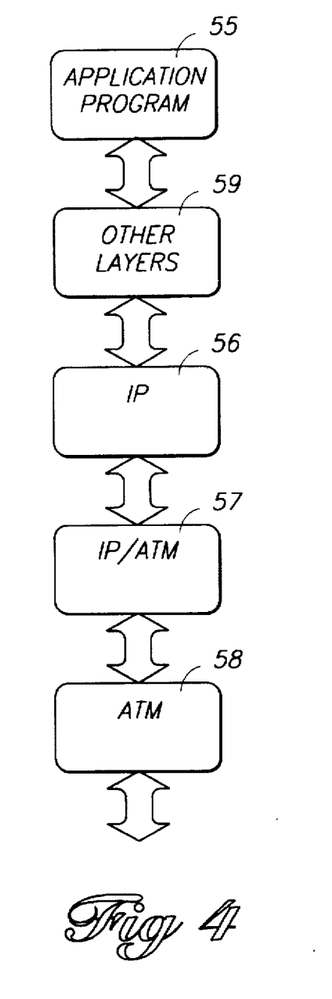
FIG. 4 is a block diagram showing network-related components implemented within the network host of FIG. 3.

Network host 50 implements a network protocol stack as shown in FIG. 4, including an IP protocol 56, an ATM protocol 58, and an IP/ATM protocol layer 57. An application program 55 communicates with these protocols using additional, upper-level protocols 59. One or more application programs such as program 55 are stored in memory 52 and executed by data processor 51. The application programs generate and accept network traffic in accordance with upper-level network protocols. IP protocol module 56 accepts data traffic from such upper-level protocol layers 59 and encapsulates such traffic in IP packets of varying size. The data traffic, now in IP packet format, is submitted to IP/ATM protocol layer 57. IP/ATM protocol layer 57 is designed to adapt the connectionless IP network protocol to the underlying connection-oriented ATM network protocol IP/ATM protocol layer 57 is stored on storage medium 52 for execution by data processor 51. The protocol layer comprises instructions that are executable to perform a sequence of steps that will be explained in detail below.

Methodological Overview

Figure 5:
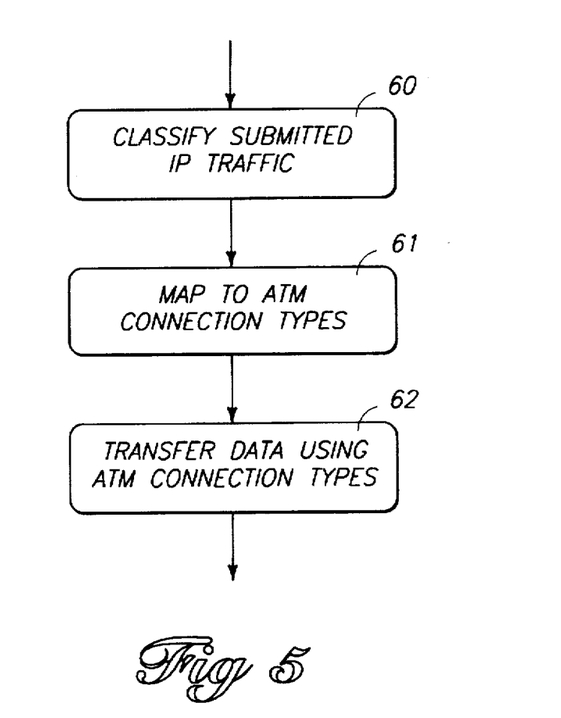
FIG. 5 is a flow chart showing general methodological steps implemented in the preferred embodiment of the invention.

FIG. 5 shows general steps in a preferred method of adapting a connectionless IP network protocol to an underlying connection-oriented ATM network protocol. These steps are implemented and performed by IP/ATM protocol layer 57. A first step 60 comprises classifying traffic submitted from the connectionless IP network protocol in accordance with pre-defined submitted traffic classifications. A subsequent step 61 comprises mapping the submitted traffic classifications to respective ATM connection types. A step 62 comprises transmitting the submitted traffic using connection types to which the classifications of the submitted traffic have been mapped. These steps will be explained in more detail below.

Classification of Submitted IP Packets

Submitted traffic is classified by IP/ATM protocol layer 57 into at least two different classifications. The first traffic classification is data traffic. Data traffic corresponds to relatively large data blocks that are transferred sporadically between different network hosts. For instance, a network host might download a code segment or an entire application program. A graphics bit map is another example of data traffic. One characteristic of data traffic is that it does not require a bandwidth commitment by the network for a long period of time.

Control traffic is the second traffic classification recognized in the preferred embodiment of the invention. While data traffic consists of large, infrequent data bursts, control traffic consists of smaller, more frequent bursts exchanged between hosts for control purposes. Examples include button presses sent from clients to servers, class references, clock synchronization messages, keyboard strokes, small display updates, etc. Since control traffic bursts are quite small, they can be served adequately by low bandwidth connections.

Classification step 60 of FIG. 5 includes a step of defining a plurality of submitted traffic classifications for traffic submitted under the connectionless IP network protocol. These classifications include data traffic and control traffic classifications as described above, and could possibly include other traffic classifications.

Step 60 is performed by IP/ATM protocol layer 57. Since IP/ATM is intended to support existing higher layer applications, the higher layers cannot be expected to provide any explicit information regarding the classification of submitted packets. In the preferred embodiment, the classification step is based on heuristics within the IP/ATM layer and implicit messages or content from protocol layers above the IP/ATM layer. More specifically, IP packets are classified by the IP/ATM layer as data traffic or control traffic as a function of implicit characteristics of the submitted IP packets—on the basis of information that is contained within the submitted IP packets.

ATM Connection Types

Step 61 of FIG. 5 comprises mapping the submitted traffic classifications to ATM connection types. The mapping step is accomplished by first defining a plurality of connection types that are supported under the connection-oriented ATM network protocol, and then mapping the traffic classifications to the defined ATM connection types.

In the preferred embodiment of the invention, ATM connection types are specified in terms of at least bandwidth and time-out. Time-out refers to the time the connection will remain in existence after traffic ceases to flow through it. A connection type is also specified in terms of an ATM quality of service (QoS) designation.

In the specific embodiment being described herein, IP/ATM protocol layer 57 maps the data traffic classification to an ATM connection of a first type having a relatively high bandwidth and a relatively short time-out. IP/ATM protocol layer 57 maps the control traffic classification to an ATM connection of a second type having a relatively low bandwidth and a relatively long time-out. In the present embodiment, both connection types are CBR connections, although other QoS types could be used.

For data traffic, a CBR connection having a high bandwidth and a short time-out reaches a good compromise between bandwidth efficiency and latency. The high bandwidth allows data transfer in a timely fashion. The short time-out improves efficiency because the connection will not be allowed to reserve unused bandwidth for any significant time. The short time-out does mean that a new connection will need to be established prior to most data traffic transfers. This has a negative impact on latency, since it takes some time to establish a CBR connection. It also consumes more of the network's connection setup capacity. However, the compromise in latency is offset by the high rate at which the data can be transferred once the connection has been established.

For control traffic, a CBR connection having a long time-out provides low latency since new ATM connections will not often need to be established. These long time out connections also place little demand on the network's connection setup capacity. Since the ATM connections used for control traffic have low bandwidths, they do not impose heavy bandwidth resource requirements on the ATM network and thus have only a slight effect on network efficiency, even though they are allowed to remain open for long periods of time. Since most control traffic is characterized by small bursts, the low bandwidth connections provide adequate service for this type of data.

Transmitting the IP Packets Under ATM

Step 62 comprises transmitting the submitted traffic using ATM connection types to which the classifications of the submitted traffic are mapped. This includes establishing and using ATM connections of the first type (high bandwidth, short time-out) to transmit submitted packets classified as data traffic over the ATM communications medium, and establishing and using ATM connections of the second type (low bandwidth, long time-out) to transmit submitted packets classified as control traffic over the ATM communications medium.

The IP/ATM protocol layer establishes and tears down ATM connections as appropriate in light of the submitted packet classifications and in light of the bandwidth, time-out, and QoS parameters specified for the different types of ATM connections. When an IP packet classified as control traffic is submitted, IP/ATM layer 57 uses an existing control connection if one exists. If there is no existing control connection to the destination host specified in the IP packet, IP/ATM layer 57 establishes such a control connection, with a relatively low bandwidth and a relatively long time-out. Similarly, IP/ATM layer 57 will use an existing data connection, if one exists, for IP packets classified as data traffic. If no such connection already exists, IP/ATM layer 57 will establish one with a relatively high bandwidth and a relatively short time-out.

The IP/ATM layer keeps track, with a timer, of the time that any particular connection is inactive. If it is inactive for more than the specified time-out, the IP/ATM layer tears it down.

As an exception to the general procedures given above, if there is an existing data connection to a destination when a control packet comes down from the IP layer, then the control packet will be sent via the data connection. Since the data connection is already established, there is no disadvantage to employing it for the transmission of control packets; and since data connections have a higher bandwidth than control connections, the control packet will be transmitted more quickly via the data connection than it would have been via a control connection. However, since the packet is actually classified as control traffic, the timer which is reset by the transmission is the timer associated with the control connection, not that which is associated with the data connection. In the case that a data packet is submitted from the IP layer, and a data connection does not already exist to the destination, the data packet may be sent on a control connection while a data connection is being set up, so that it is not delayed by the connection setup time.

Figure 6:
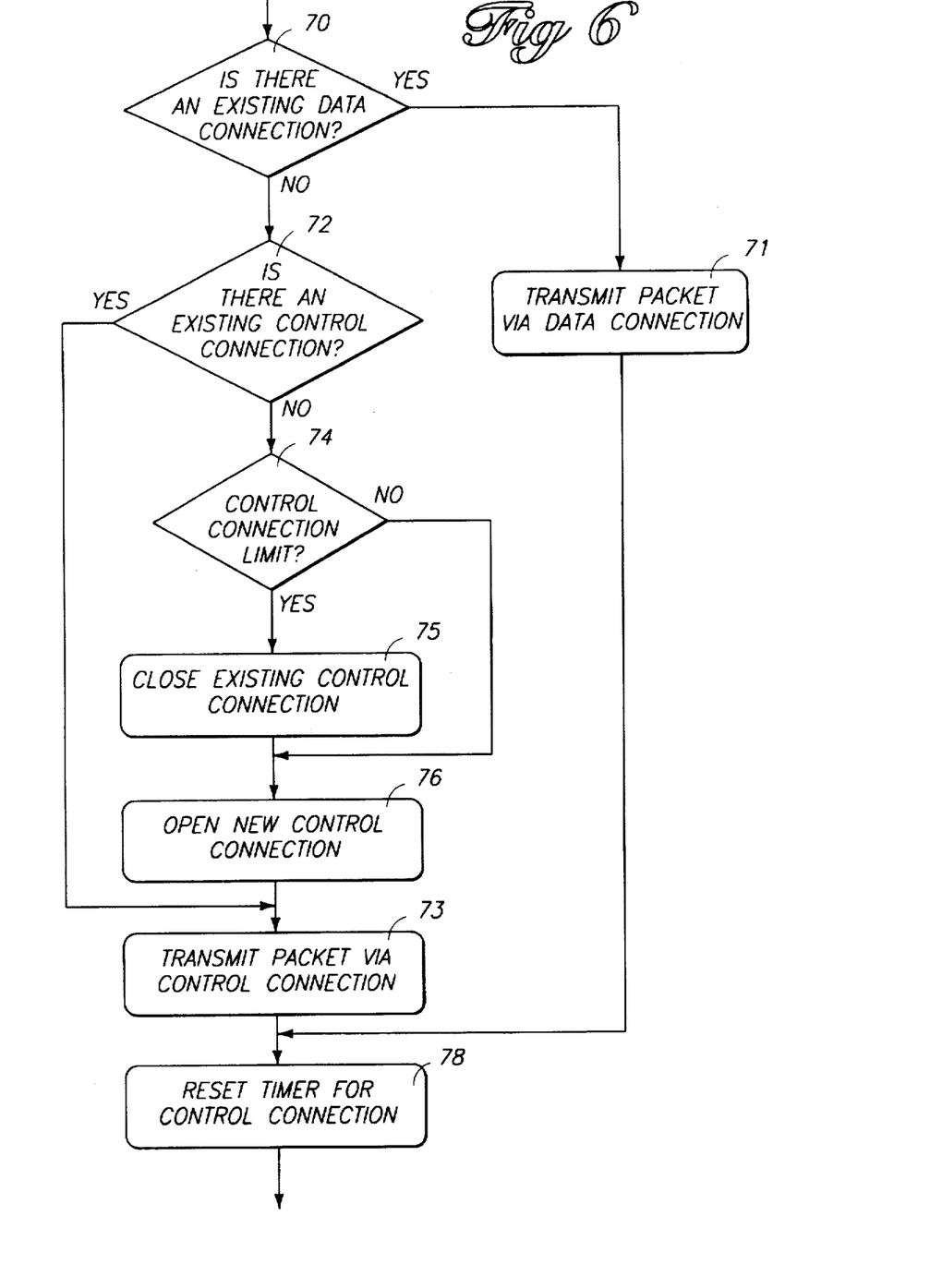
FIGS. 6 and 7 are flow charts showing more specific methodological steps implemented in the preferred embodiment of the invention.

FIG. 6 shows steps performed in transmitting a control packet. Step 70 comprises determining whether there is an open data connection to the destination. If there is, step 71 is performed of transmitting the IP control traffic through the existing data connection. If there is no existing data connection to the destination, a step 72 is performed of determining whether there is already an open control connection to the destination. If so, step 73 is executed of transmitting the control traffic through the control connection. Otherwise, a step 74 is executed of determining whether an upper limit on the number of open control connections has been reached. If the limit has been reached, step 75 is executed of closing an existing control connection. The selection of a control connection to be closed is preferably based on a 'least recently used' (LRU) algorithm. Once the connection has been closed, or after it has been determined that there is no need to close a connection, step 76 is executed of opening a new control connection to the destination of the submitted packet. Step 73 is then executed, transmitting the packet using the existing or newly-created control connection. Subsequent step 78 comprises resetting a timer that tracks how long the control connection has been open since its last use.

Figure 7:
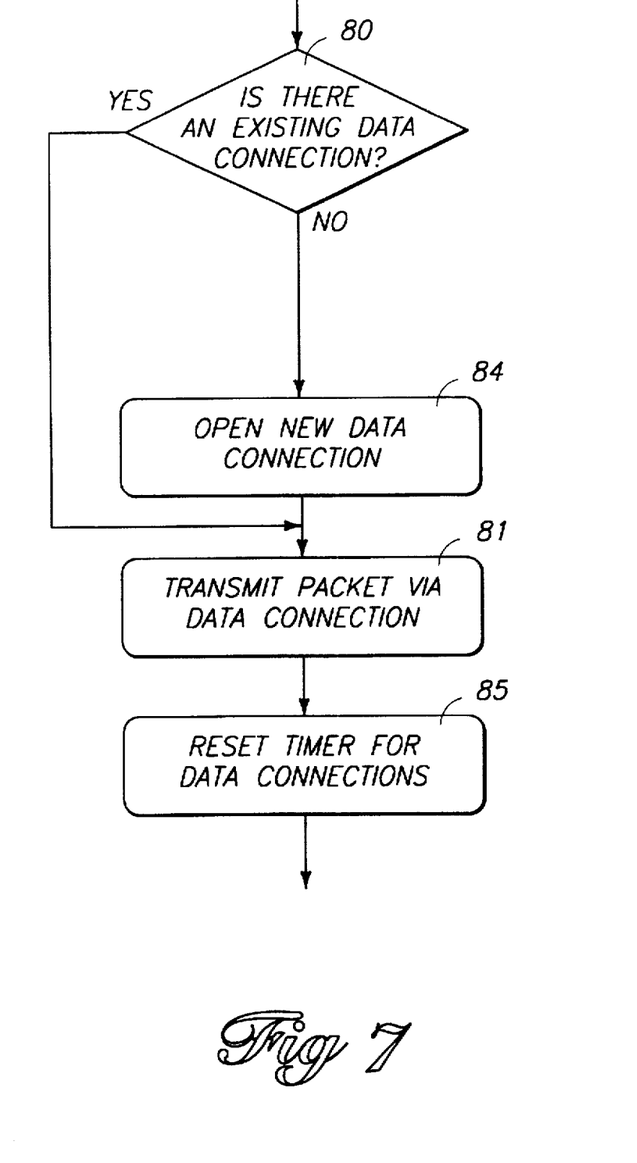

FIG. 7 shows steps performed in transmitting a packet that has been classified as data traffic. Step 80 comprises determining whether there is an open data connection to the destination. If there is, step 81 is performed of transmitting the IP control traffic through the existing data connection. If there is no existing data connection to the destination, step 84 is executed of opening a new data connection to the destination of the submitted packet. Step 81 is then executed, transmitting the data packet using the existing or newly-created data connection. Subsequent step 85 comprises resetting a timer that tracks how long the data connection has been open since its last use.

Policies

The classification of submitted IP traffic is based, in the preferred embodiment, on what are referred to as policies. Policies are described in a policy configuration file on each host. The policy configuration file is read by the IP/ATM layer, at boot time, or when the host is configured. Although the preferred embodiment of the invention uses policy configuration files, other means of describing the policies to the IP/ATM layer, are equally useful.

In addition to specifying to the IP/ATM layer how to classify submitted packets, policies also describe the characteristics of the connection that should be used to carry packets of a specific classification, for example, the bandwidth of the connection, the period of inactivity for which a connection should remain open (the time out period) and the service class (CBR, VBR, UBR or ABR) of the connection.

Thus, a policy describes classes of packets and the parameters of the connections which should be used to transmit each class of packets.

Policies are specified for individual network hosts, and may be different from host to host (although it is desirable to limit the number of different configurations).

In the preferred embodiment, packets are classified primarily based on their size. Packet size can be easily determined from the packet's IP header or from the headers of higher-level packets encapsulated within the IP packet. Relatively large packets are classified as data traffic while relatively small packets are classified as control traffic. Thus, classification is performed by comparing the sizes of the submitted IP packets to a size threshold specified in the policy configuration file. Packets larger than the size threshold are classified as data traffic. Packets smaller than the size threshold are classified as control traffic.

Policies can optionally (or additionally) direct the IP/ATM layer to classify packets on the basis of other information contained within the packets. For example, classification can be based on UDP protocol ports or other fields specified within IP packet headers. Packets destined for well-known ports can be consistently classified in a certain way, regardless of packet size. Other port numbers, that are not well-known, can also be used as a basis for packet classification, thus allowing applications to specify custom classifications to override classifications than might otherwise be made on the basis of packet size. Similarly, the IP/ATM protocol layer can be configured to classify packets on the basis of IP addresses specified in packets. These classification schemes will be referred to herein as 'custom' classifications. Policies specifying custom classifications also specify the parameters of the connections used to carry packets in these classes. Custom classifications override standard classifications based on packet size.

To allow further optimization of network usage, policies will specify a limit on the number of control connections which may be open simultaneously. Recall that control connections are relatively low bandwidth, but have long time out periods. As a result, if a host is allowed to open an unlimited number of these connections, the aggregate available bandwidth in the network may be reduced significantly. Therefore, when opening a new control connection, the IP/ATM protocol layer will first close an existing control connection if necessary to keep the total number of control connections from the network host within a specified limit. Typically, the least recently used connection will be the one closed.

It may be useful to allow certain applications to initiate changes within the IP/ATM protocol layer policies. For instance, the IP/ATM layer might be capable of operating in two or three modes, such as high activity, low activity, and idle. Certain applications might be allowed to send explicit messages to the IP/ATM layer causing it to derive its policies from a different policy configuration file. The IP/ATM layer might be directed to use more aggressive policies for higher activity modes and less aggressive policies for lower activity modes. This improves network usage by providing less network resources to those clients that need them less, and more resources for other clients that need them more.

Many schemes can be envisioned for indicating policies and changes in policies, to the IP/ATM layer. Ultimately, adjustments to policies could be based on closed loop control systems operating at each host, and using local network performance data as input.

Policy Parameters

Following is a sample list of parameters comprising a policy.

Size Threshold. This is the threshold to which packets sizes are compared to determine whether a packet should be sent on a control connection or a data connection. Packets smaller in size than this threshold are sent using a control connection. Packets larger in size than this threshold are sent using a data connection.

Max Number of Control Connections. This is the maximum number of control connections that are allowed to be open at any time from a particular network host. Control connections as defined and configured herein are long-lived and inherently inefficient. As long as there is a small number of such connections, their inefficiency is tolerable. This parameter is provided and used to limit the number of co-existing control connections.

Custom Connection Indicator. This is a UDP or TCP protocol port number. Application programs may submit packets with this port number to force the IP/ATM protocol layer to use a "custom" ATM connection type. More generally, other fields in the IP datagram could be used as the basis for classification. UDP/TCP port numbers are just one example.

Custom IP Address List. This is a list of all destination IP addresses which require special treatment.

The ATM connection parameters include bandwidth and time-out parameters that are used by the ATM protocol layer in specifying connection parameters for ATM connections used to transmit submitted packets of the different classifications. Following are examples of connection parameters that might be included in a configuration file:

Control Connection Bandwidth. This specifies the forward and reverse bandwidths of a control connection. Control connections are typically specified to have low bandwidths.

Control Connection Time-out. This specifies how long inactive control connections will be held. Each time a packet is submitted on a control connection, a timer is started. If no packets are sent or received on this connection for the specified time-out, the connection is torn down. Control connections are configured to have relatively long time-outs in the preferred embodiment of the invention.

Data Connection Bandwidth. This specifies the forward and reverse bandwidths for data connections.

Data Connection Time-Out. This specifies how long inactive data connections will be held. Data connections are typically configured to have short time-outs. If no data packets are sent or received on this connection for the specified time-out, the connection is torn down.

Custom Connection Bandwidth. This is the bandwidth that is to be associated with a custom ATM connection type.

Custom Connection Time-out. This is the time-out that is to be associated with a custom ATM connection type. Connections requiring higher bandwidths should generally be held for shorter periods than those requiring lower bandwidths.

Control Connection QoS. This is the ATM QoS (quality of service) with which all control connections are opened. In the embodiment described herein, this parameter is set to CBR. UBR is an alternative QoS that is currently available in most systems.

Data Connection QoS. This is the ATM QoS with which all data connections are opened. Again, this is set equal to CBR in the preferred embodiment.

Custom Connection QoS. This indicates the QoS to be used for custom connections.

Configuration Policy Example

The parameters listed above are preferably arranged in a pre-defined format in configuration files. IP/ATM layer 57 reads its configuration file prior to classifying packets and establishing ATM connections. Through the use of these files, a system administrator can define and fine-tune the behavior the IP/ATM protocol layer and the utilization of network resources.

The following is an example of a configuration file that might be used in a set-top box (STB) that communications with a headend in an interactive TV system:

| | | |
|---|---|---|
| sizethreshold | 65535 | Effectively forces all connections to be control |
| maxctrlconnections | 7 | limited to 7 simultaneous control connections to headend |
| mtu | 32768 | maximum packet size generated by STB |
| highdefault | | this is for data connections, not used by STBs |
| qos | CBR | |
| fwdbandwidth | 0 | |
| revbandwidth | 0 | |
| time-out | 1 | |
| end | | |
| lowdefault | | this is for control connections |
| qos | CBR | uses CBR connections |
| fwdbandwidth | 80000 | 80 kbits/sec forward bandwidth |
| revbandwidth | 80000 | 80 kbits/sec reverse bandwidth |
| time-out | 1800 | long time-out: 1/2 hour |
| end | | |

The following is an example of a configuration file that might be used for a headend in an interactive TV system:

| | | |
|---|---|---|
| sizethreshold | 1000 | packets larger than 1000 bytes are data traffic |
| maxctrlconnections | -1 | no limit on the number of control connections |
| mtu | 32768 | maximum packet size generated by the server |
| highdefault | | servers open unidirectional, high bandwidth, short time-out CBR data connections |
| qos | CBR | uses CBR connections |
| fwdbandwidth | 10000000 | 10 mbit/sec forward bandwidth |
| revbandwidth | 0 | no reverse bandwidth |
| time-out | 5 | short--five seconds |
| end | | |
| lowdefault | | control connections from servers are short-lived, low bandwidth |
| qos | CBR | uses CBR connections |
| fwdbandwidth | 79000 | 79 kbits/sec forward bandwidth--less than STB control connections so that STB connections will be preferred |
| revbandwidth | 0 | force STBs to establish control connections |
| time-out | 5 | 5 seconds--should expire quickly so that STB-established control connections will take over |
| end | | |

These examples provide unidirectional, high bandwidth, short-lived connections from servers to STBs whenever large data downloads are necessary. They provide bidirectional, low bandwidth, long-lived control connections between an STB and a server to carry all control traffic. The distinction between control traffic and data traffic is made on the basis of the sizethreshold parameter. A large sizethreshold parameter for STBs forces them to use only control connections.

The general policy implemented by the above configuration files is to allow STBs to control the control connections while servers control the data connections. This policy is enforced by preventing STBs from opening data connections (by specifying a large sizethreshold parameter) and by allowing servers to open only very short-lived, unidirectional control connections, which are quickly replaced by the bidirectional, long-lived control connections opened by STBs.

Under the policies established by these configuration files, an STB will open a bi-directional control connection to a server for all control traffic. The server, when it needs to send control data, will see the downstream half of the control connection opened by the STB. In the case that a server needs to send control data to an STB before the STB has opened a bi-directional control connection to that server, the server will be allowed to open a short-lived, uni-directional control connection. However, as soon as the STB opens its bi-directional control connection to the server, the server will use this connection preferentially, due to its slightly higher bandwidth. This will cause the short-lived, uni-directional control connection set up by the server to time out.

Custom classifications and connection types can also be set up in configuration files. The following example sets up a custom classification at UDP port 3061, in a style similar to that of the configuration file examples given above:

| CUSTOM | |
|---|---|
| UDPPort | 3061 |
| qos | UBR |
| fwdbandwidth | 1000 |
| revbandwidth | 500 |
| time-out | 30 |
| end | |

Custom classifications based on IP addresses can be similarly specified.

Conclusion

This invention allows IP packets to be mapped to ATM connection types in a way that tends to optimize network efficiency and responsiveness. One attractive characteristic of the invention is that it can be tuned by a system administrator to meet the needs of a particular ATM distribution network. This provides a degree of flexibility that will be greatly needed as IP/ATM systems become used more and more widely.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A digital communications network comprising:
    a plurality of network hosts;
    an ATM communication medium connecting the network hosts;
    one or more traffic classification parameters stored by at least one of the network hosts;
    an IP/ATM protocol layer executing on at least one of the network hosts to adapt an IP network protocol to an underlying ATM network, the IP/ATM protocol layer performing the following steps:
        classifying packets submitted from the IP network protocol as data traffic or control traffic by comparing implicit characteristics of the submitted packets to the traffic classification parameters;
        defining a first ATM connection type having a relatively high bandwidth and a relatively short time-out;
        defining a second ATM connection type having a relatively low bandwidth and a relatively long time-out;
        establishing and using ATM connections of the first type to transmit submitted packets classified as data traffic;
        establishing and using ATM connections of the second type to transmit submitted packets classified as control traffic.

2. A digital communications network as recited in claim 1, wherein the traffic classification parameters are variable by a system administrator to optimize communications under the ATM network.

3. A digital communications network as recited in claim 1, wherein the traffic classification parameters include a size threshold, the IP/ATM protocol layer comparing the sizes of the submitted packets to the size threshold to classify the packets as data traffic or control traffic.

4. A digital communications network as recited in claim 1, further comprising bandwidth and time-out configuration parameters stored by at least one of the network hosts, wherein the IP/ATM protocol layer sets the bandwidths and the time-outs of the first and second ATM connection types as a function of the bandwidth and time-out configuration parameters.

5. A digital communications network as recited in claim 1, further comprising bandwidth and time-out configuration parameters stored by at least one of the network hosts, wherein the IP/ATM protocol layer sets the bandwidths and the time-outs of the first and second ATM connection types as a function of the bandwidth and time-out configuration parameters, the traffic classification parameters and the bandwidth and time-out configuration parameters being variable by a system administrator to optimize communications under the ATM network protocol.

6. A digital communications network as recited in claim 1, wherein the IP/ATM protocol layer performs the following additional steps:
    defining one or more custom ATM connection types in terms of bandwidths and time-outs;
    the step of classifying submitted packets comprising identifying certain packets having pre-selected protocol port specifications and classifying such identified packets as custom traffic;
    establishing and using ATM connections of the custom types to transmit submitted packets classified as custom traffic.

7. A digital communications network as recited in claim 6, further comprising bandwidth and time-out configuration parameters stored by at least one of the network hosts, wherein the IP/ATM protocol layer sets the bandwidths and the time-outs of the custom ATM connection types as a function of the stored bandwidth and time-out configuration parameters, the traffic classification parameters and the bandwidth and time-out configuration parameters being variable by a system administrator.

8. A digital communications network comprising:
    a plurality of network hosts;
    an ATM communication medium connecting the network hosts;

configuration parameters stored by at least one of the network hosts, the configuration parameters including bandwidth, time-out, and one or more traffic classification parameters;

an IP/ATM protocol layer executing on at least one of the network hosts to adapt an IP network protocol to an underlying ATM network protocol, the IP/ATM protocol layer performing the following steps:

determining classifications of packets submitted from the IP network protocol by comparing implicit characteristics of the submitted IP packets to the traffic classification parameters;

establishing and using ATM connections to transmit the submitted IP packets over the ATM communications medium;

specifying connection parameters for said ATM connections as a function of the determined classifications of the submitted packets and in accordance with the stored bandwidth and time-out configuration parameters.

9. A digital communications network as recited in claim 8, wherein the configuration parameters include a size threshold, the IP/ATM protocol layer comparing the sizes of the submitted packets to the size threshold to determine classifications of the submitted packets.

10. A digital communications network as recited in claim 8, wherein:

the configuration parameters include a size threshold;

the IP/ATM protocol layer compares the sizes of the submitted packets to the size threshold to determine classifications of the submitted packets;

the configuration parameters include first bandwidth and time-out parameters that are used by the IP/ATM protocol layer in specifying connection parameters for ATM connections used to transmit submitted packets that are larger than the size threshold;

the configuration parameters include second bandwidth and time-out parameters that are used by the IP/ATM protocol layer in specifying connection parameters for ATM connections used to transmit submitted packets that are smaller than the size threshold.

11. A digital communications network as recited in claim 8, wherein the IP/ATM protocol layer determines classifications of the submitted packets on the basis of network addresses specified within the submitted packets.

12. A digital communications network as recited in claim 8, wherein the IP/ATM protocol layer determines classifications of the submitted packets on the basis of protocol ports specified within the submitted packets.

13. A method of adapting an IP network protocol to an underlying ATM network, the method comprising the following steps:

defining a plurality of submitted traffic classifications including data traffic and control traffic classifications;

classifying packets submitted under the IP network protocol in accordance with the submitted traffic classifications by referring to information that is contained within said submitted packets;

defining a first ATM connection type having a relatively high bandwidth and a relatively short time-out;

defining a second ATM connection type having a relatively low bandwidth and a relatively long time-out;

establishing and using ATM connections of the first type to transmit submitted packets classified as data traffic;

establishing and using ATM connections of the second type to transmit submitted packets classified as control traffic.

14. A method as recited in claim 13, further comprising a step of providing configuration parameters that are variable by a system administrator to optimize communications under the ATM network, the configuration parameters including bandwidth and time-out parameters for the first and second connection types.

15. A method as recited in claim 13, further comprising a step of providing configuration parameters that are variable by a system administrator to optimize communications under the ATM network protocol, such configuration parameters including:

bandwidth and time-out parameters for the first and second connection types; and traffic classification parameters;

the step of classifying the submitted packets being performed as a function of the traffic classification parameters.

16. A method as recited in claim 13, wherein the step of classifying packets is performed on the basis of their size.

17. A method as recited in claim 13, wherein the step of classifying packets comprises classifying relatively large packets as data traffic and relatively small packets as control traffic.

18. A method as recited in claim 13, wherein the step of defining a plurality of submitted traffic classifications includes defining one or more custom traffic classifications, the method further comprising:

defining one or more custom ATM connection types in terms of bandwidths and time-outs;

the step of classifying packets comprising identifying certain packets having pre-selected protocol port specifications and classifying such identified packets as custom traffic;

establishing and using ATM connections of the custom types to transmit submitted packets classified as custom traffic.

19. A method as recited in claim 13, wherein the step of classifying packets is performed on the basis of network addresses specified within the packets.

20. A method as recited in claim 13, wherein the step of classifying packets is performed on the basis of protocol ports specified within the packets.

21. A network host programmed to implement the steps of claim 13.

22. A method of adapting a connectionless network protocol to an underlying connection-oriented network protocol, the method comprising the following steps:

determining classifications of traffic submitted from the connectionless network protocol in accordance with implicit characteristics of the submitted traffic;

transmitting the submitted traffic using connections established under the connection-oriented network protocol;

specifying connection parameters for said connections as a function of the determined classifications of the submitted traffic.

23. A method as recited in claim 22, further comprising a step of including bandwidth and time-out parameters in the connection parameters specified for the connections.

24. A method as recited in claim 22, wherein the traffic submitted from the connectionless network protocol comprises packets of varying size, the step of determining classifications of submitted traffic being performed with respect to each packet as a function of its size.

25. A method as recited in claim 22, wherein the step of determining classifications of the submitted traffic is performed as a function of one or more network addresses specified within the submitted traffic.

26. A method as recited in claim 22 wherein the step of determining classifications of traffic submitted is performed as a function of one or more protocol ports specified within the submitted traffic.

27. A method as recited in claim 22, wherein:

the submitted traffic comprises packets of varying size;

the step of determining classifications of the submitted traffic is performed with respect to each packet as a function of its size;

the step of specifying connection parameters comprises specifying a relatively high bandwidth and a relatively short time-out for connections transmitting packets that are classified as being relatively large in size, and specifying a relatively low bandwidth and a relatively long time-out for connections transmitting packets that are classified as being relatively small in size.

28. A method as recited in claim 22, wherein the step of determining classifications of the submitted traffic is performed as a function of one or more configuration parameters that can be varied by a system administrator to optimize communications under the connection-oriented network protocol, the connection parameters being based upon the configuration parameters.

29. A method as recited in claim 28, further comprising a step of including a size threshold parameter in the configuration parameters, wherein the submitted traffic comprises packets of varying size, the step of determining classifications of the submitted traffic being performed with respect to each packet as a function of the size of the packet in comparison to the size threshold.

30. A network host programmed to implement the steps recited in any one of claims 22–29.

31. A method of adapting a connectionless network protocol to an underlying connection-oriented network protocol, the method comprising the following steps:

defining a plurality of submitted traffic classifications for traffic submitted under the connectionless network protocol;

classifying the submitted traffic accordance with the submitted traffic classifications;

defining a plurality of connection types that are supported under the connection-oriented network protocol, said connection types being defined in terms of at least bandwidth and time-out;

mapping the submitted traffic classifications to the connection types;

transmitting the submitted traffic using connection types to which the classifications of the submitted traffic are mapped.

32. A method as recited in claim 31, wherein the step of classifying the submitted traffic is performed as a function of implicit characteristics of the submitted traffic.

33. A method as recited in claim 32, wherein the submitted traffic comprises packets of varying size, the step of classifying the submitted traffic being performed with respect to each packet as a function of the size of the packet.

34. A method as recited in claim 32, wherein the step of classifying the submitted traffic is performed as a function of one or more network addresses specified within the submitted traffic.

35. A method as recited in claim 32, wherein the step of classifying the submitted traffic is performed as a function of one or more protocol ports specified within the submitted traffic.

36. A method as recited in claim 31, wherein the step of defining the plurality of connection types includes defining a first connection type having a relatively high bandwidth and a relatively short time-out, and a second connection type having a relatively low bandwidth and a relatively long time-out.

37. A method as recited in claim 31, wherein the step of defining a plurality of submitted traffic classifications includes defining a data traffic classification and a control traffic classification.

38. A method as recited in claim 37, wherein the step of classifying submitted traffic includes classifying such traffic as data traffic or control traffic depending on implicit characteristics of the submitted traffic.

39. A method as recited in claim 37, wherein:

the step of classifying submitted traffic includes classifying such traffic as data traffic or control traffic depending on implicit characteristics of the submitted traffic;

the step of defining the plurality of connection types includes defining a first connection type having a relatively high bandwidth and a relatively short time-out, and a second connection type having a relatively low bandwidth and a relatively long time-out;

the mapping step comprises mapping the data traffic and control traffic classifications to the first and second connection types, respectively.

40. A method as recited in claim 39, wherein the submitted traffic comprises packets of varying size, the step of classifying the submitted traffic comprising classifying a particular packet as data traffic if it is relatively large and as control traffic if it is relatively small.

41. A method as recited in claim 31, further comprising a step of limiting the number of connections of any particular connection type that are allowed to exist at any given time at a particular network host.

42. A method as recited in claim 31, wherein the step of classifying the submitted traffic is performed as a function of one or more configuration parameters that can be varied by a system administrator to optimize communications under the connection-oriented network protocol.

43. A method as recited in claim 42, further comprising a step of including a size threshold parameter in the configuration parameters, wherein the submitted traffic comprises packets of varying size, the step of classifying the submitted traffic being performed with respect to each packet as a function of the size of the packet in comparison to the size threshold.

44. A method as recited in claim 42, further comprising a step of including bandwidth and time-out parameters in the configuration parameters for each connection type.

45. A network host programmed to implement the steps of claim 31.

46. A computer-readable storage medium that stores an IP/ATM protocol layer for adapting an IP network protocol to an underlying ATM network, the ATM protocol layer comprising instructions that are executable on a machine to perform the following steps:

determining classifications of packets submitted under the IP network protocol by referring to information that is contained within said submitted packets;

transmitting the submitted packets using ATM connections;

specifying connection parameters for said ATM connections as a function of the determined classifications of the submitted packets.

47. A computer-readable storage medium as recited in claim 46, the IP/ATM protocol layer comprising further instructions that are executable on the machine to perform the following additional step: including bandwidth and time-out parameters in the connection parameters specified for the ATM connections.

48. A computer-readable storage medium as recited in claim 46, wherein the step of determining classifications of submitted packets is performed with respect to each packet as a function of its size.

49. A computer-readable storage medium as recited in claim 46, wherein the step of determining classifications of submitted packets is performed with respect to each packet as a function of one or more network addresses specified within the packet.

50. A computer-readable storage medium as recited in claim 46, wherein the step of determining classifications of submitted packets is performed with respect to each packet as a function of one or more protocol ports specified within the packet.

51. A computer-readable storage medium as recited in claim 46, wherein:

the step of determining classifications of the submitted packets is performed with respect to each packet as a function of its size;

the step of specifying connection parameters comprises specifying a relatively high bandwidth and a relatively short time-out for ATM connections transmitting packets that are classified as being relatively large in size, and specifying a relatively low bandwidth and a relatively long time-out for ATM connections transmitting packets that are classified as being relatively small in size.

52. A computer-readable storage medium as recited in claim 46, wherein the step of determining classifications of the submitted packets is performed as a function of one or more configuration parameters that can be varied by a system administrator to optimize communications under the ATM network, the connection parameters being based upon one or more of the configuration parameters.

53. A computer-readable storage medium as recited in claim 52, the IP/ATM protocol layer comprising further instructions that are executable on the machine to perform the following additional step: including a size threshold parameter in the configuration parameters, the step of determining classifications of the submitted packets being performed with respect to each packet as a function of the size of the packet in comparison to the size threshold.

* * * * *